Patented Dec. 29, 1936

2,066,090

UNITED STATES PATENT OFFICE 2,066,090

MANUFACTURE OF RESINS

William B. Borst, Chicago, Ill., assignor to Universal Oil Products Company, Chicago, Ill., a corporation of Delaware No Drawing. Application October 20, 1934,
Serial No. 749,273

6 Claims. (Cl. 260—2)

This invention relates more particularly to the manufacture of moldable resins from low boiling petroleum fractions.

In a more specific sense the invention has reference to the manufacture of resins suitable for various commercial purposes which require material of relatively high resistance to ordinary solvents and chemical reagents, relatively high melting point, a limited resiliency and low conductivity for heat or electricity. Examples of uses to which resinous materials of such character are put are the manufacture of switchboard, battery boxes, camera parts, phonograph records, instruments cases, electrical armatures and commutators, telephone receivers, buttons, pipe stems, etc.

The manufacture of the so-called synthetic resins to augment the natural sources of supply which are principally in the saps of plants and trees has been given a great deal of attention for many years on account of the diminishing supply and increasing cost of the natural products. Owing to this intensive development work, many of the artificial resinous materials which have been produced are superior to the naturally occurring substances. They have the added advantage of uniformity and exact reproducibility.

To assist in defining the character of the present invention and indicating the position of the process and product in the field of synthetic resin manufacture, the following rather inclusive definition of a synthetic resin (which appears in a standard text) is quoted below:

"A synthetic resin is a complex amorphous organic semi-solid or solid material, usually a mixture of substances; built up by chemical reaction and approximating the natural resins in various physical properties; namely, lustre, fracture, comparative brittleness at ordinary temperatures, insolubility in water and fusibility or plasticity when heated or exposed to heat and pressure but commonly deviating widely from natural resins in chemical constitution and behavior with reagents."

From the above it is seen that natural and artificial resins are differentitated principally on a basis of their physical properties and their general reactivities with chemical reagents and not on a basis of their exact chemical constitution, which is nearly always very difficult to determine.

In one specific embodiment the present invention comprises the manufacture of resins by extensively oxidizing low boiling hydrocarbon mixtures from petroleum in the presence of heavy metal oxides, and incorporating the separated insoluble material with regulated proportions of a filler and either formaldehyde or a substance capable of yielding formaldehyde.

According to the present invention it is preferred to oxidize cracked hydrocarbon oil distillates of approximate gasoline boiling range with air or oxygen at somewhat elevated temperatures in the neighborhood of 300° F., preferably above 250° F., and under sufficient pressure to prevent undue volatilization of the hydrocarbon mixture until approximately 40% by weight of oxidized products of a gummy or resinous character are produced. The separated material then receives an addition of approximately 15% of its weight of a heavy metal oxide and is again heated and oxidized with air or oxygen at substantially the same conditions as in the primary oxidation treatment. This procedure may be varied by adding the metal oxide to the pressure apparatus in which the first oxidation is conducted and combining the steps of oxidation and combination with metal oxide into one operation.

The composite resinous material is then mixed with various types of fillers such as wood flour, asbestos fiber, mica, cotton, etc., about 1–3% of a formaldehyde-yielding substance such as trioxymethylene or hexamethylenetetramine is added and the mix is then worked on hot rolls using a trace of lubricant such as stearic acid to prevent sticking. The material from the rolling or kneading operation which is conducted preferably at temperatures of from 300 to 400° F., is cooled and pulverized to make a powder suitable for hot molding.

In regard to the scope of the invention in respect to the ranges in qualities and quantities of materials and the conditions of operation, several statements are necessary. As to the oils which may be primarily oxidized, it is preferred to use cracked hydrocarbon distillates of the approximate boiling range of commercial motor fuels since the yield of resins or gums from them may be somewhat higher than from oils containing relatively lower percentages of unsaturated hydrocarbons. However, if found desirable or advantageous for any reason low boiling straight run and more or less paraffinic gasolines may be used since these will be to some extent dehydrogenated by the primary catalytic oxidation treatment. As a rule, however, the yield of gummy material will be lower in these cases. The use of distillates of higher boiling range than gasoline is generally not advantageous on account of the formation of increasing amounts of dark colored and tarry products of an asphaltic rather than a resinous or gummy character.

Oxidation of gasolines may be conducted at temperatures of from approximately 212° F., up to some temperature corresponding to the limit of safe operation in a given pressure apparatus which upper temperature will depend upon the particular oxidation characteristics of the gasoline and the tendency toward spontaneous ignition with explosive violence. This in turn will be influenced by the catalytic effect of the particular heavy metal oxide chosen so that no hard and fast rules can be laid down in this connection. When using cracked gasoline and ferric oxide, 300° F. has been found to be a suitable temperature for producing sufficient yields of products of good quality. The pressure developed will vary with the boiling range and chemical character of the gasoline and the rate of oxidation. Again taking cracked gasoline and ferric oxide as an example, a pressure of 140-160 pounds per square inch gauge is usually encountered when the oxidation rate is kept at a point permitting safe and accurate control.

The term "heavy metal" is used in the present instance to apply to those metals having a specific gravity of 2.5 or greater and thus includes such metals as those of the iron group, to wit, iron, nickel and cobalt and also such metals as chromium, manganese, zinc, cadmium, aluminum, etc., to limit the present statement to the more common and readily procurable metals, although any metal falling within this category may be employed. Particularly good results are obtained when utilizing the oxides of iron, nickel, cobalt and chromium, with specific variations in each case in the character of the resins produced, which are not exactly equivalent in their properties. With a given gasoline and a definite degree of oxidation thereof, the amount of metal oxide will vary roughly with its molecular weight, as it is apparent that there is a definite combining weight corresponding to some chemical reaction between the oxidized oil and the metal oxide. It is possible that certain acids are produced in the oxidation of the hydrocarbons, but the precise determination of this fact is difficult and the formation of organic metal salts is not offered as a complete explanation of the observed results which have been obtained in practice.

It is essential in the final step of producing moldable resins from the primary oxidized-oil-metal resin that a certain amount of some formaldehyde derivative be added in minor percentage, along with a variable proportion of filling, spacing or binding material. To substances of outstanding merit as a source of formaldehyde are trioxymethylene and hexamethylenetetramine. The former compound is meta formaldehyde which has a melting point of 171-172° C. and the formula $(CH_2O_3)$. This substance may be prepared by various methods such as, for example, by the hydrolysis of methylene diacetate ester or by distilling glycollic acid with concentrated sulfuric acid.

Hexamethylenetetramine has a rather complex constitution and may be formed by one method by passing formaldehyde vapor into a concentrated solution of ammonia, evaporating to a syrupy consistency and then pouring into alcohol to effect precipitation. It may also be prepared by the action of ammonia on trioxymethylene and from the interaction of alcoholic ammonia and methylene chloride. A simple commercial method of manufacture consists in dissolving ammonium carbonate in a 40% formaldehyde solution, evaporating to dryness under reduced pressure, subliming the residue under vacuum and recrystallizing from absolute alcohol. When heated the above compound decomposes into formaldehyde and ammonia to a considerable extent and thus yields the small amount of formaldehyde, which is found to be essential to the proper setting and consistency of the resinous materials produced, and ammonia which acts catalytically in the resin-forming reactions.

As previously intimated the invention is not specially restricted to the use of any particular type of filler in the final resins but may employ any one or mixtures of different materials depending upon the results obtained therewith in small scale tests. Wood flour is generally utilizable, either from hardwoods or softwoods, and fine asbestos fiber furnishes an excellent binder.

In the primary oxidation step a pressure vessel is partially filled with gasoline to be oxidized, heated to a temperature of approximately 300° F., and treated with a slow stream of air or oxygen which is introduced beneath the surface of the liquid, preferably through sprays or perforated pipes to produce fine bubbles and intimate contact. After the required period of oxidation the vessel is cooled and any excess pressure is released, the contents being then a relatively heavy and generally light-colored resin under a supernatant layer of hydrocarbon oils, which may be preserved for blending with motor fuel depending upon its boiling range and other physical characteristics such as color, odor, and oxygen and sulphur content.

The gum removed from the pressure vessel is then melted and mixed with approximately an equal weight of filler and a small percentage of the formaldehyde-yielding substances already mentioned and the mix is then worked for a sufficient time on rolls at temperatures from 300-400° F. until the ingredients are thoroughly mixed, after which they are cooled and pulverized.

The following example is given to indicate the general method of operation and the results which are normally obtained when operating the process of the invention, although the example is not to be considered as unduly restricting its scope.

A cracked gasoline produced by the pyrolysis of a Mid-Continent residuum and boiling within the approximate range of 100 to 425° F., was placed in a pressure vessel provided with an inlet spray line. The vessel was heated to approximately 300° F., and a mixture of about equal parts of air and oxygen was introduced and the stream of gas continued until about 3 pounds of gummy material was produced per gallon of the original gasoline. The pressure apparatus was cooled and opened and the residual unoxidized hydrocarbon liquid layer removed by decantation. 15% of ferric oxide by weight of the resinous material remaining in the bomb was added, the bomb was closed and subjected to further oxidation under substantially the same conditions as in the first stage.

After this treatment the resinous composite was drawn off hot, mixed with an equal weight of wood flour and about 2% of hexamethylenetetramine, calculated on the total weight of resin and filler. After considerable working upon hot rolls at a temperature of 350° F., using a trace of stearic acid to prevent sticking, the final resin was cooled and pulverized to yield a powder capable of hot molding into any required shape.

The character of the invention and the results obtainable by its use will be seen from the foregoing specification and single example although the scope of the invention is not to be unduly limited by the statements made in either section.

I claim as my invention:

1. A process for the manufacture of a resin which comprises, subjecting hydrocarbon distillate of approximately gasoline boiling range to the action of oxygen and a heavy metal oxide at an elevated temperature above 250° F. and while substantially in liquid phase for a time period adequate to react a substantial portion of the distillate with the oxide.

2. A process for the manufacture of a resin which comprises, subjecting cracked hydrocarbon distillate of approximately gasoline boiling range to the action of oxygen and a heavy metal oxide at an elevated temperature above 250° F. and while substantially in liquid phase for a time period adequate to react a substantial portion of the distillate with the oxide.

3. A process for the manufacture of a resin which comprises, subjecting cracked hydrocarbon distillate of approximately gasoline boiling range to the action of oxygen at an elevated temperature above 250° F., in the presence of a heavy metal oxide, separating the insoluble material and mixing the same with regulated proportions of a filling material.

4. A process for the manufacture of a resin which comprises, subjecting cracked hydrocarbon distillate of approximately gasoline boiling range to the action of oxygen at an elevated temperature above 250° F., in the presence of a heavy metal oxide, separating the insoluble material from the liquid and subjecting the same to the action of formaldehyde.

5. A process for the manufacture of a resin which comprises, subjecting hydrocarbon distillate of approximately gasoline boiling range to the action of oxygen at an elevated temperature above 250° F., in the presence of a heavy metal oxide, separating the insoluble material from the liquid and subjecting the same to the action of formaldehyde.

6. A process for producing resinous material from hydrocarbon distillate boiling substantially within the gasoline range, which comprises oxidizing the distillate sufficiently to convert a substantial portion thereof into oxidized products of a gummy character, separating said products and reacting the same with heavy metal oxide in the presence of oxygen.

WILLIAM B. BORST.